(12) United States Patent
Mayer et al.

(10) Patent No.: US 6,976,309 B2
(45) Date of Patent: Dec. 20, 2005

(54) VEHICLE UNDERBODY AND METHOD OF FORMING THEREOF

(75) Inventors: Robert R. Mayer, Clio, MI (US); Anil K. Sachdev, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/739,830

(22) Filed: Dec. 18, 2003

(65) Prior Publication Data
US 2005/0134095 A1 Jun. 23, 2005

(51) Int. Cl.[7] .............................................. B62D 25/20
(52) U.S. Cl. .................... 29/897.2; 29/469.5; 296/204; 296/193.07; 228/141.1
(58) Field of Search ............................ 29/897.2, 469.5; 228/141.1; 296/204, 205, 209, 193.07, 193.09, 296/203.02

(56) References Cited

U.S. PATENT DOCUMENTS

| 2,788,223 | A | * | 4/1957 | Mersheimer et al. ....... 280/800 |
| 5,210,921 | A | * | 5/1993 | Booher ...................... 29/401.1 |
| 5,619,784 | A | * | 4/1997 | Nishimoto et al. ........... 29/430 |
| 5,944,377 | A | * | 8/1999 | Vlahovic .................... 296/204 |
| 6,022,069 | A | * | 2/2000 | Birkwald et al. ........... 296/204 |
| 6,182,411 | B1 | * | 2/2001 | Ganser et al. ................ 52/480 |
| 6,334,252 | B1 | * | 1/2002 | Sato et al. .................. 29/897.2 |
| 6,357,819 | B1 | * | 3/2002 | Yoshino ................ 296/187.02 |
| 6,375,247 | B1 | * | 4/2002 | Volz et al. ..................... 296/66 |
| 6,540,286 | B2 | * | 4/2003 | Takemoto et al. .......... 296/204 |
| 6,557,930 | B1 | | 5/2003 | Bruggemann et al. ...... 296/205 |

* cited by examiner

Primary Examiner—Dennis H. Pedder
(74) Attorney, Agent, or Firm—Kathryn A. Marra

(57) ABSTRACT

An underbody for a vehicle includes a floorpan defining a part of an assembly, a rocker slidably engaged with the floorpan, and a rail slidably engaged with the floorpan. The assembly is formed as a unit about a first and a second bend axis.

16 Claims, 4 Drawing Sheets

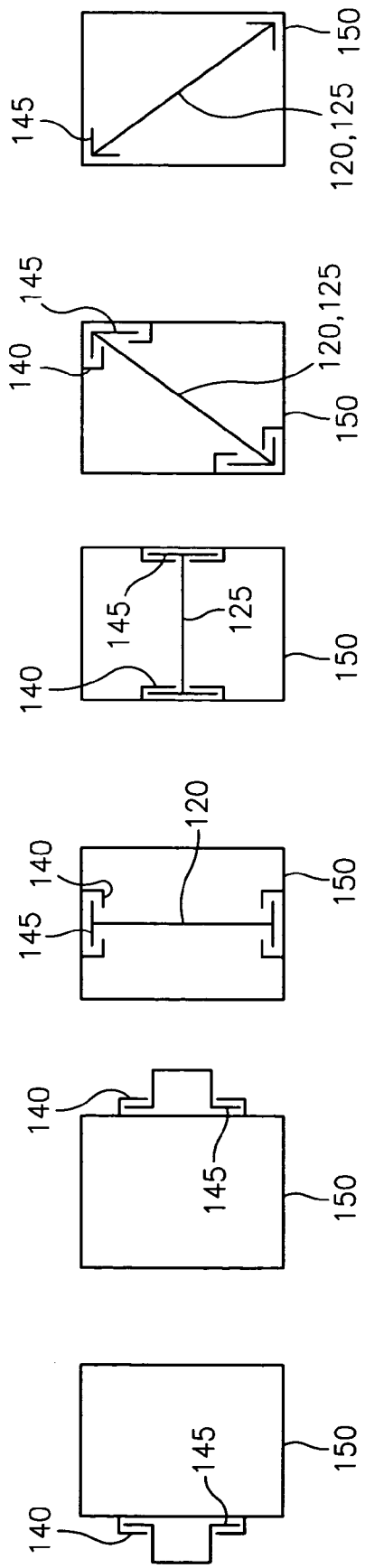

VEHICLE UNDERBODY AND METHOD OF FORMING THEREOF

BACKGROUND OF THE INVENTION

The present disclosure relates generally to a vehicle underbody and a method of forming thereof, and particularly to a formed vehicle underbody for a passenger vehicle.

Underbody structures for vehicles may use components fabricated from extrusions, castings, stampings, and roll-formed sections, for example, with each component being formed prior to assembly and welding. As the size and complexity of a vehicle underbody structure increases, so too does the dimensional tolerance buildup among and between the various parts. As a consequence, underbody structures may be standardized, which may provide a degree dimensional stability at the assembly level, but may also limit design options with regard to the overall vehicle. Accordingly, there is a need in the art for a vehicle underbody arrangement that overcomes these drawbacks.

SUMMARY OF THE INVENTION

In one embodiment, an underbody for a vehicle includes a floorpan defining a part of an assembly, a rocker slidably engaged with the floorpan, and a rail slidably engaged with the floorpan. The assembly is formed as a unit about a first and a second bend axis.

In another embodiment, a method of forming an underbody of a vehicle is disclosed. A flat floorpan defining a part of an assembly is positioned. First and second rockers are slidably engaged at first and second sides of the floorpan such that the rockers do not traverse a first bend axis. First and second rails are slidably engaged with the floorpan such that the rails do traverse a second bend axis. The assembly is formed with respect to the first and second bend axes.

In a further embodiment, an underbody for a passenger vehicle made using the method of positioning a flat floorpan defining a part of an assembly, slidably engaging a first rocker and a second rocker with the floorpan, slidably engaging a first rail and a second rail with the floorpan, applying an adhesive between at least two parts of the assembly, forming the assembly with respect to a first and a second bend axis in the presence of the adhesive that is partially cured and in the absence of a welded joint, and welding at least two components of the assembly subsequent to the forming.

BRIEF DESCRIPTION OF THE DRAWINGS

Referring to the exemplary drawings wherein like elements are numbered alike in the accompanying Figures:

FIGS. 4–9 depict alternative cross-sections of an exemplary member for use in an embodiment of the invention;

DETAILED DESCRIPTION OF THE INVENTION

An embodiment of the invention provides an underbody for a passenger vehicle that is assembled flat and then formed as an integral unit. While the embodiment described herein depicts a floorpan, a rocker, and a rail, as exemplary underbody components, it will be appreciated that the disclosed invention is also applicable to other underbody components, such as a driveshaft channel or a wire harness gutter, for example.

Figure 1:
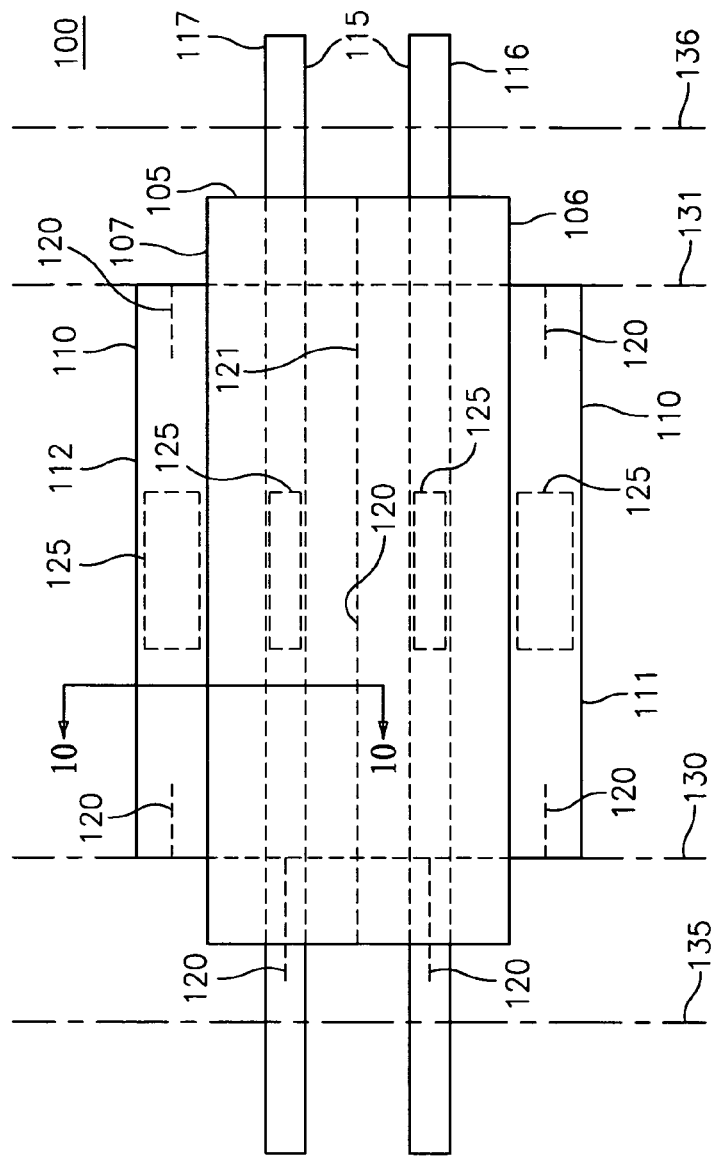
FIGS. 1–3 depict an orthogonal arrangement showing a plan view, an end view, and a side view of an exemplary embodiment of the invention.
Figure 3:
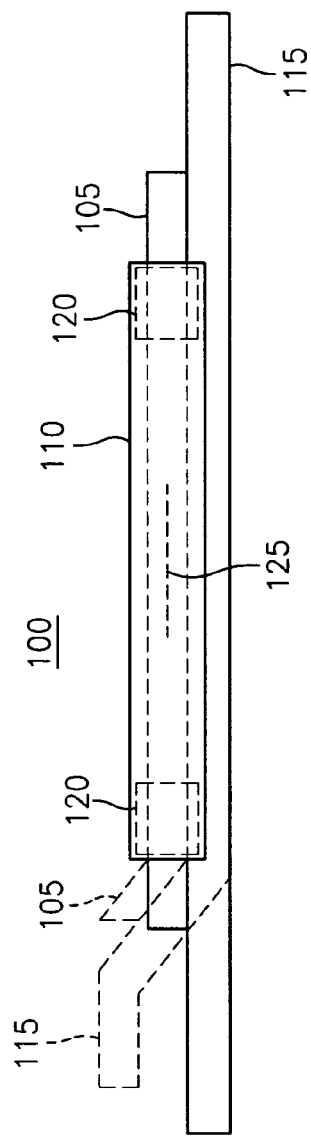
Figure 2:
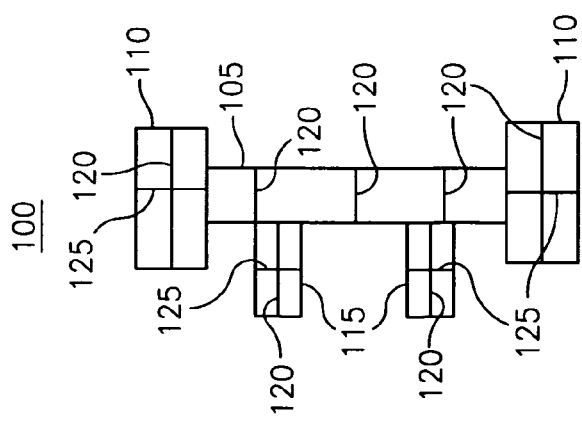

FIGS. 1–3 depict an orthogonal arrangement of a plan view (FIG. 1), an end view (FIG. 2), and a side view (FIG. 3), of an exemplary embodiment of an underbody 100 prior to forming (depicted as solid lines in FIGS. 1–3), and subsequent to forming (depicted as dashed lines in FIG. 3). Underbody 100 is an assembly of components that primarily includes a floorpan 105, two rockers 110, and two rails 115. However, as will be discussed later, underbody 100 may include other components such as reinforcement ribs 120, spacers 125, and foam 154, 156, for example. Floorpan 105, rockers 110, rails 115, ribs 120, and spacers 125, may be slidably engaged with each other in the manner described later in reference to FIGS. 4–9. In an embodiment, floorpan 105, rockers 110 and rails 115 may be made from extruded material, such as steel, aluminum, plastic, or any other suitable material, that may be cut to length prior to assembly. Floorpan 105, rocker 110, and rail 115, may be fabricated using a large single or multi-cell extrusion die, for example. In an alternative embodiment, floorpan 105, rockers 110, and rails 115, may be made from tubular shaped material that is cast, molded, bent, or otherwise formed. In a further alternative embodiment, floorpan 105, rockers 110, and rails 115, may be made from extruded, roll formed, cast, stamped, or any other shaping method, using steel or any other suitable material. To form an embodiment of underbody 100, rockers 110 are positioned such that they do not traverse a first bend axis 130, and rails 115 are positioned such that they do traverse a second bend axis 135. However, alternative embodiments may include rockers 110 traversing first bend axis 130, rails 115 not traversing second bend axis 135, or any combination of rockers 110 and rails 115 traversing or not traversing first and second bend axes 130, 135. Bend axes 130, 135 may be located at either end of underbody 100 as depicted by additional bend axes 131, 136 shown in FIG. 1. Prior to forming, underbody 100 is absent any welded joints, however, underbody 100 may have partially cured adhesive, such as epoxy for example, placed between two or more parts, thereby holding the parts of the assembly fairly stable while permitting some degree of slippage during forming. In an alternative embodiment, the various components of underbody 100 may include holes, thereby providing access for forcing the adhesive between the mating parts. The forming process may include a roll-forming process, discussed later in reference to FIG. 14, or any other forming process suitable for the purpose. After forming, the various components of underbody 100 may be welded as desired for structural integrity and dimensional stability.

Figure 14:
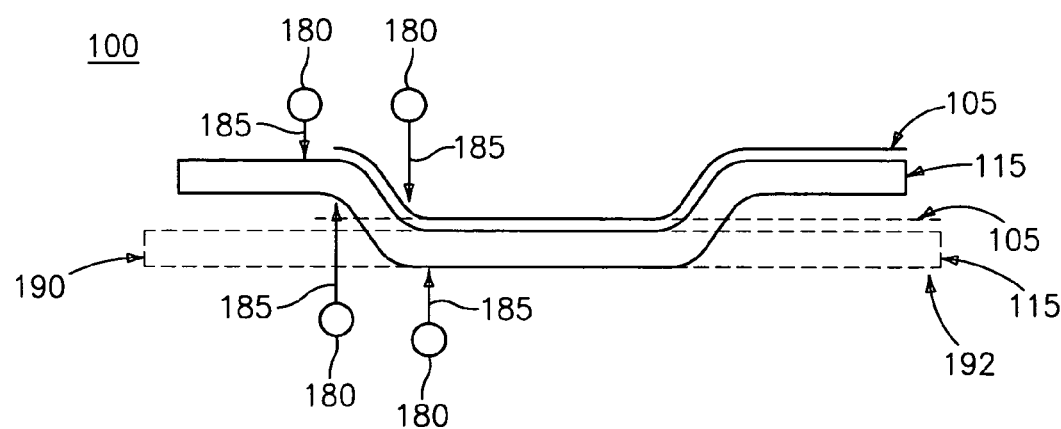
FIG. 14 depicts an exemplary arrangement for forming the embodiment depicted in FIGS. 1–3.

In an embodiment, floorpan 105 runs from the front of the dash of the vehicle to the rear bumper (depicted generally via the length of floorpan 105 in FIG. 14, wherein the vehicle dash is at the left end and the rear bumper is at the right end of floorpan 105). Part of the extrusion of floorpan 105 may be cut away at the rear to accommodate clearance for the rear tire (not shown). In an embodiment, rails 115 run from the front bumper to the rear bumper, and rockers 110 begin behind the front tire and end in front of the rear tire.

By using metal extrusions for floorpan 105, rockers 110, rails 115, ribs 120, and/or spacers 125, shapes of varied geometries may be used, which may be different from the geometries specifically shown, thereby enabling assembly components to be slidably engaged with one another via channels 140 and tabs 145, which may be seen by now referring to FIGS. 4–9. The channels 140 and tabs 145 depicted in FIGS. 4–9 are representative only, and it will be appreciated that other arrangements of channels and tabs may be equally suitable for the purpose disclosed herein. The box-shaped member 150 of FIGS. 4–9 is representative of a cross-section of floorpan 105, rocker 110, and/or rail 115, as depicted in the end view of FIG. 2, or any other extruded member in accordance with an embodiment of the invention. Reinforcement ribs 120 and spacers 125, which may be oriented diagonally, are also depicted in FIGS. 4–9. Adhesive may be applied between channels 140 and tabs 145 prior to forming, where the adhesive may be only partially cured at the time of forming, thereby providing a means of restraining parts while providing a degree of slippage therebetween. In an alternative embodiment, the adhesive may be fully cured but with a pliable characteristic after curing, such as with a silicone adhesive for example. In yet another alternative embodiment, the adhesive may be fully cured and permitted to separate from the substrate during bending. In yet a further alternative embodiment, ribs 120 and spacers 125 may be attached to floorpan 105, rockers 110, and rails 115, by means other than adhesive, such as with self-piercing rivets for example.

As seen by now referring back to FIGS. 1–3, ribs 120 and spacers 125 may be slidably engaged with floorpan 105, rockers 110 and rails 115, only where needed and with a length that is less than the length of the surrounding extrusion, thereby reducing material usage and weight. For example, FIGS. 2 and 3 show ribs 120 at both ends of rockers 110, but not in the center, and spacers 125 in the center of rockers 110 and rails 115, but not at the ends. Other arrangements of ribs and spacers may be employed as desired. A central rib 121 shown in FIG. 1 also represents a central longitudinal axis of underbody 100 and floorpan 105. Rockers 110 and rails 115, also having longitudinal axes not specifically illustrated but generally located central to the extruded length of each part, are oriented parallel to central longitudinal axis 121. In an embodiment, a first rocker 111 is disposed at a first side 106 of floorpan 105, a second rocker 112 is disposed at a second side 107 of floorpan 105, a first rail 116 is disposed closer to first side 106 than to second side 107, and a second rail 117 is disposed closer to second side 107 than to first side 106. In an embodiment, first and second bend axes 130, 135 and 131, 136 are oriented perpendicular to longitudinal axis, depicted generally by numeral 121.

Figure 10:
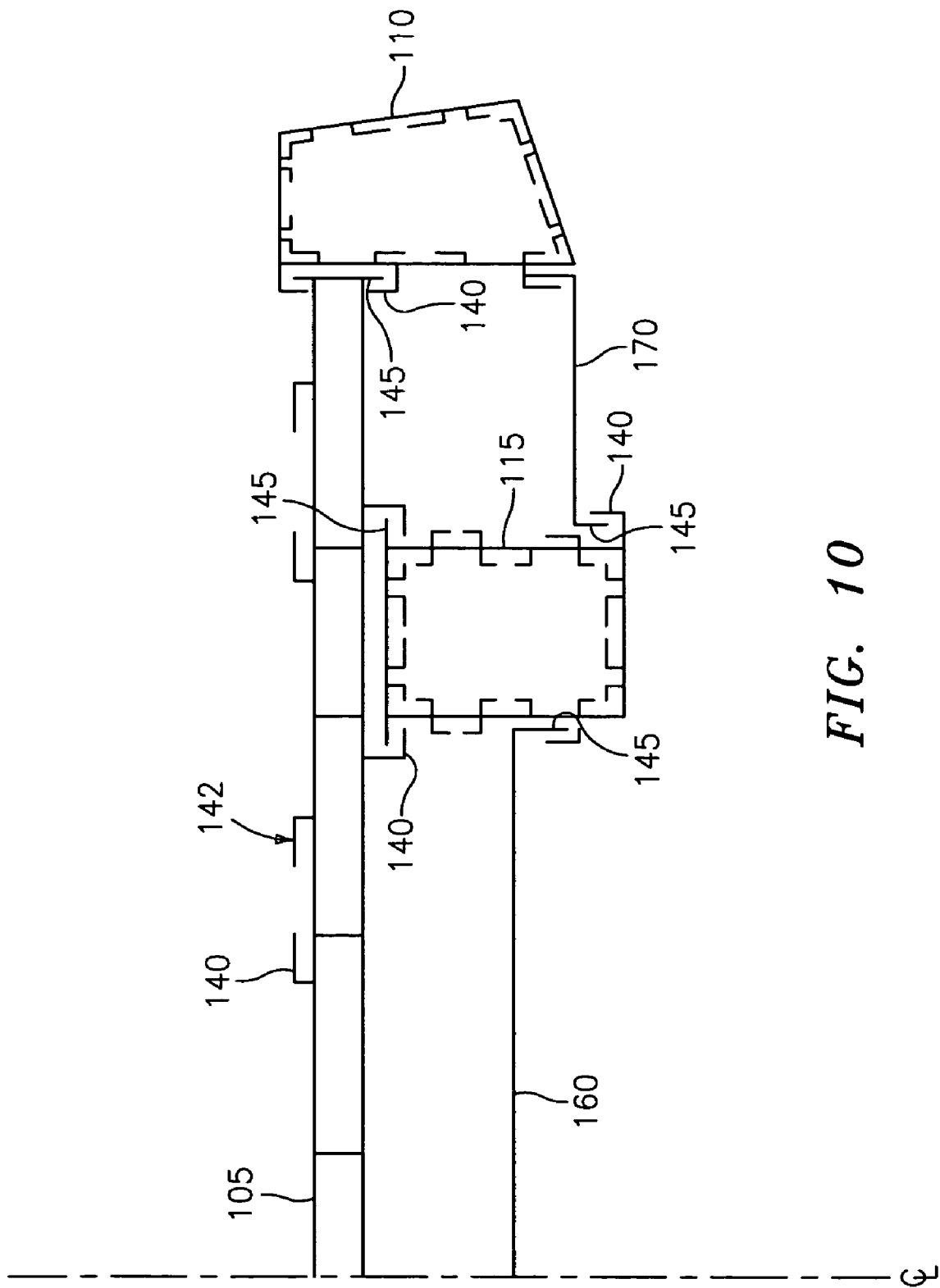
FIG. 10 depicts a section cut through a portion of the view depicted in FIG. 1.

Referring to FIG. 10, a section cut through underbody 100 of FIG. 1 is depicted with the addition of a torsion bar 160 and a torque box 170. Channels 140 and tabs 145 provide a means for slidably engaging floorpan 105 with rocker 110 and rail 115, for slidably engaging torsion bar 160 with rail 115, and for slidably engaging torque box 170 with rail 115 and rocker 110. Channels 142 provide a means for slidably engaging a seat track (not shown) with floorpan 105. Other features may be slidably engaged with underbody 100 using a similar arrangement of channels 140 and tabs 145.

Figure 11:
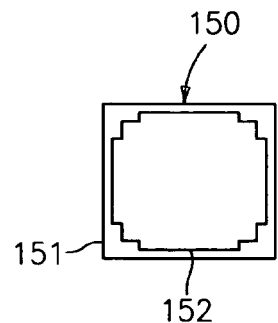
FIGS. 11–13 depict additional alternative cross-sections to those depicted in FIGS. 4–9.
Figure 12:
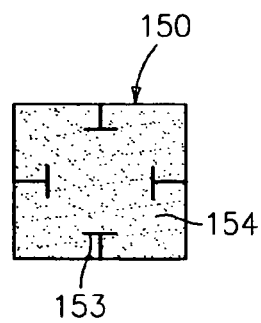
Figure 13:
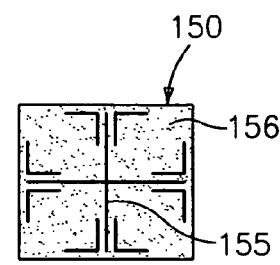

Referring to FIGS. 11–13, various cross section views of box-shaped member 150 are depicted having thick corner sections 151, thin side sections 152, T-channels 153 for holding foam 154, and inserts 155 (plastic or metal for example) with bonded foam 156. In an embodiment, foam 154, 156 may provide sound insulation, structural integrity, force damping, or any combination thereof. While only a few embodiments of box-shaped member 150 are depicted, it will be appreciated that other embodiments may be envisioned without departing from the scope of the invention.

Referring to FIG. 14, a side view of underbody 100 (similar to that of FIG. 3) is depicted in both the pre-formed (dashed line) and post-formed (solid line) arrangement. In the pre-formed arrangement, floorpan 105 and rails 115 are flat, while in the post-formed arrangement, floorpan 105 and rails 115 are bent about bend axes 130, 135 and 131, 136 (see FIG. 1). The forming of underbody 100 may be accomplished via a forming tool 180, which has rollers (illustrated as circular objects) that push slightly off-axis from each other and against underbody 100 in the direction of arrows 185. Consequently, the operation of forming tool 180 is referred to as roll-forming. While forming tool 180 is depicted having rollers, it will be appreciated that any forming tool suitable for bending underbody 100 as an assembly may be used. The ends 190, 192 of underbody 100 may be constrained during roll forming sufficient to prevent buckling at the front of the dash, at the bottom of the rear seating location, and at the top of the rear seating location. The combination of constraining and roll forming results in a degree of stretching, which is referred to as stretch forming. In an embodiment, internal mandrels (internal to box-shaped members 150) may be used to provide a means of constraining the various components during stretching or stretch forming.

In an embodiment, underbody assembly 100 is formed by the method of positioning a flat floorpan 105 defining a part of the assembly, slidably engaging a first rocker 111 at a first side 106 of floorpan 105, slidably engaging a second rocker 112 at a second side 107 of floorpan 105, slidably engaging a first rail 116 and a second rail 117 at floorpan 105, and forming the assembly. In an embodiment, rockers 111, 112 do not traverse first bend axis 130, 131, and rails 116, 117 do traverse a second bend axis 135, 136. An adhesive may be applied between any of the components of underbody assembly 100, which is only partially cured at the time of forming, thereby providing a degree of fixation while providing some degree of slippage during forming. Prior to forming, underbody assembly 100 is absent welded joints. Also prior to forming, reinforcement ribs 120 and/or spacers 125 may be inserted into box-shaped members 150, and box-shaped members 150 may be filled with a foam 154, 156. Subsequent to forming, underbody assembly 100 is welded as appropriate for structural integrity and dimensional stability. In an alternative embodiment, foam 154, 156 may be injected into box-shaped members 150 subsequent to welding.

As disclosed, some embodiments of the invention may include some of the following advantages: use of aluminum extrusions that may be slidably engaged for a strong yet lightweight construction; more custom underbody designs owing to the use of extruded metals, and especially extruded aluminum; use of simple cross-section extruded parts to form complex cross-section assemblies; ability to absorb higher impact forces by utilizing multi-cell structures; use of reinforcement ribs and spacers only where appropriate thereby saving on material and labor costs; and, reduced transmission of noise through the underbody assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of forming an underbody of a vehicle, comprising:
    positioning a flat floorpan defining a part of an assembly;
    slidably engaging a first rocker at a first side, and a second rocker at a second side, of the floorpan, such that the rockers do not traverse a first bend axis;
    slidably engaging a first rail and a second rail with the floorpan such that the rails do traverse a second bend axis; and
    forming the assembly with respect to the first and the second bend axis.

2. The method of claim 1, further comprising:
    applying an adhesive between at least two parts of the assembly; and
    forming the assembly in the presence of the adhesive that is partially cured and in the absence of a welded joint.

3. The method of claim 1, wherein:
    at least one of the floorpan, the rocker, and the rail, comprises a tubular shaped extruded component;
    the rockers and the rails are slidably engaged with the floorpan via channels and tabs; and
    longitudinal axes of the rockers and longitudinal axes of the rails are disposed parallel to a longitudinal axis of the floorpan.

4. The method of claim 1, wherein the forming further comprises:
    forming to assembly such that the first and the second bend axis are each perpendicular to the longitudinal axis of the assembly.

5. The method of claim 3, further comprising:
    inserting at least one of a reinforcement rib, a spacer, and a foam, into at least one of the tubular shaped extruded component wherein the reinforcement rib; the spacer, and the foam, have a longitudinal length that is less than the longitudinal length of the tubular shaped extruded component.

6. The method of claim 1, wherein the forming comprises roll-forming and further comprising:
    constraining an end of the assembly sufficiently to prevent buckling during the roll-forming.

7. The method of claim 2, further comprising:
    welding at least two components of the assembly subsequent to the forming.

8. A method of forming an underbody of a vehicle, comprising:
    positioning a floorpan defining a part of an assembly, the floorpan having a longitudinal axis;
    slidably engaging a rocker with the floorpan in the direction of the longitudinal axis such that the rocker does not traverse a first bend axis, the first bend axis oriented transverse to the longitudinal axis;
    slidably engaging a rail with the floorpan in the direction of the longitudinal axis such that the rail does traverse a second bend axis, the second bend axis oriented transverse to the longitudinal axis; and
    subsequent to slidably engaging the rocker and the rail, forming the assembly with respect to the first and the second bend axes.

9. The method of claim 8, wherein the forming comprises:
    forming the assembly in a first direction with respect to the first bend axis, and in a second opposite direction with respect to the second bend axis.

10. The method of claim 8, wherein:
    the rails are slidably engaged with the floorpan inboard of the rockers.

11. The method of claim 8, further comprising:
    constraining an end of the assembly while forming the assembly in a manner to prevent buckling thereof.

12. The method of claim 11, wherein:
    in response to the assembly being constrained and formed, stretch forming the assembly.

13. The method of claim 8, further comprising:
    prior to the forming, applying an adhesive between parts of the assembly; and
    wherein the forming further comprises forming the assembly in the absence of a welded joint between the puts of the assembly.

14. The method of claim 13, further comprising:
    welding together parts of the assembly subsequent to the forming.

15. The method of claim 8, further comprising:
    prior to the forming, inserting reinforcement ribs and/or spacers into the rocker and/or rail.

16. The method of claim 14, further comprising:
    injecting a structural foam into the rocker and/or rail subsequent to the welding.

* * * * *